TELEPHONE DIAL CONTROLLED PERFORATOR

Filed Dec. 30, 1957 5 Sheets-Sheet 1

INVENTOR
DONALD C. CROLL
BY Jh L Stirling
ATTORNEY

Dec. 12, 1961 D. C. CROLL 3,012,711

TELEPHONE DIAL CONTROLLED PERFORATOR

Filed Dec. 30, 1957 5 Sheets-Sheet 2

Dec. 12, 1961 D. C. CROLL 3,012,711

TELEPHONE DIAL CONTROLLED PERFORATOR

Filed Dec. 30, 1957 5 Sheets-Sheet 4

Dec. 12, 1961 D. C. CROLL 3,012,711

TELEPHONE DIAL CONTROLLED PERFORATOR

Filed Dec. 30, 1957 5 Sheets-Sheet 5

1

3,012,711

TELEPHONE DIAL CONTROLLED PERFORATOR

Donald C. Croll, Pleasant Valley, N.Y., assignor to International Business Machines Corporation, New York, N.Y., a corporation of New York Filed Dec. 30, 1957, Ser. No. 706,005
9 Claims. (Cl. 234—121)

This invention relates to a system of data transmission and more particularly to a system for dialing data over an automatic telephone line to control a statistical card perforator.

Transmission of statistical data between distant points has been accomplished in the past by shipping perforated cards or tapes prepared from source data to a distant accounting or clearing point where data from the cards is used to control accounting machines. This method is slow and open to loss of cards in transit. Data has also been transmitted by telephone and telegraph but only by the use of special machines and circuits.

It is, therefore, the principal object of this invention to provide a system wherein data from source documents is transmitted over an ordinary telephone line to a distant card perforator.

Another object is to provide a circuit whereby data may be transmitted to a distant perforator by dialing said data over a telephone line.

A further object is to provide control and supervisory circuits for the perforator which will permit the transmission of statistical data by dialing over a telephone line.

Other objects of the invention will be pointed out in the following description and claims and illustrated in the accompanying drawings, which disclose, by way of example, the principle of the invention and the best mode which has been contemplated of applying that principle.

In the drawings:

FIGS. 1, 2, 3 and 4, combined, form a schematic circuit diagram of the invention.

Figure 1:
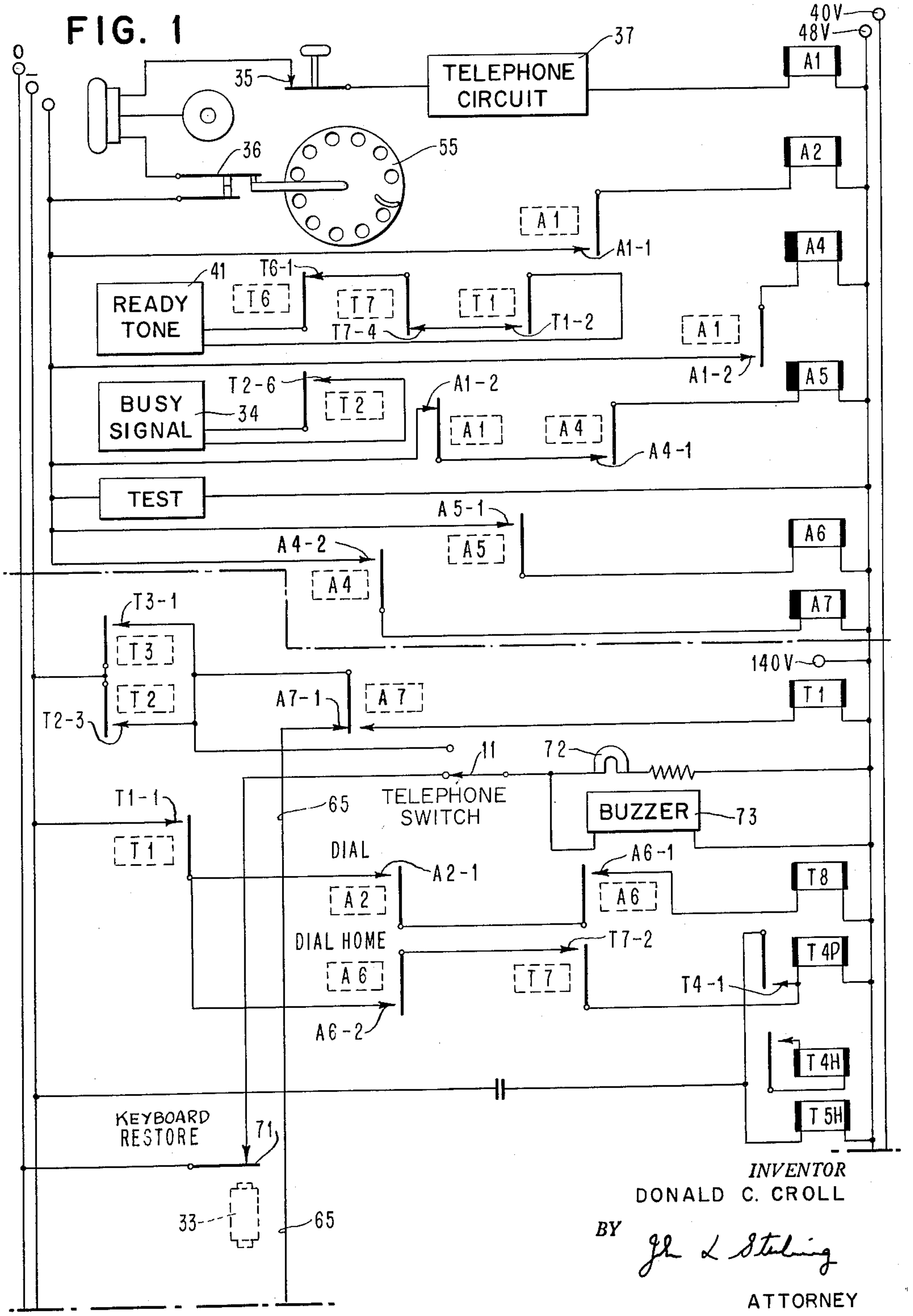

It is proposed to use a standard telephone circuit to which has been added the necessary control and supervisory features for actuating a card perforator, the card perforator being of a well known type similar to that disclosed in U.S. patent to E. W. Gardinor and Arnold B. Crowell 2,647,581. The circuit has been greatly simplified but the mechanical features are the same. In view of this, no detail description of the perforator will be given outside that needed for an understanding of this invention.

The perforator is a well known type wherein a statistical card is perforated a column at a time by a row of twelve punches selected by magnetic means and mechanically actuated. Selection of an interposer magnet couples a punch actuator to a mechanically operated bail which upon actuation of a clutch forces the selected punch through the card. The interposer may be selected by a keyboard, a reading device or, as in the present invention, by pulses over a telephone line generated by telephone dial.

The card to be punched is fed from a magazine to a pusher which inserts the edge of the card between feed rolls which then feed the card column by column under control of an escapement mechanism, under a set of punches until the card is finally ejected into a storage pocket. Contacts are provided which indicate the presence of a card in the perforating position. Operations such as skipping columns, duplicating fields and identification of field length are controlled by a program card perforated in accordance with the sequence of operations desired and mounted on a drum rotated in synchronism with the stepping of the card through the perforator.

2

The telephone is a standard instrument. Certain contacts are added to the receiving end of the telephone line to care for dial and busy signals, dial pulses and the connect-disconnect operation.

The format of the card is laid out with a certain field or fields in which telephone data is to be entered. Entry of this data is controlled by the program card signalling the perforator to follow a certain procedure as will be described below.

A number of perforators, for instance, five or six may be located at one point each with its own telephone line and supervised by one attendant.

The use of stepping switches and automatic telephone connecting circuits are well known standard telephone procedure as described in "Automatic Telephone Practice" by Hershey and the Patents 1,395,977 to Stearn et al. and 2,161,864 to R. E. Hershey, however, since these are not claimed as part of the present invention, no detail description will be given.

The attendant tends the perforators by maintaining the card supply and removing and caring for the perforated cards. Also any perforator failure which is indicated to the attendant by an audible and visible signal is easily cared for by disconnecting the machine from the line until repairs can be completed.

Once a perforator is conditioned by the attendant the subscriber upon dialing the required digits will be connected and will receive a ready tone indicating that the perforator is in condition to accept data. If for any reason such as a card jam or no cards in the hopper or the perforator is already receiving data from another subscriber a tone will be heard similar to but differing distinguishably from the regular telephone busy signal. The ready tone is of such frequency as to be easily recognizable, and is heard at all times except during a dial, skip, duplicate or card feeding operation. In other words, absence of the ready tone for any prolonged period (approximately 3 seconds) during dialing of information would indicate to the subscriber that the perforator was disabled and unable to accept data.

Figure 2:
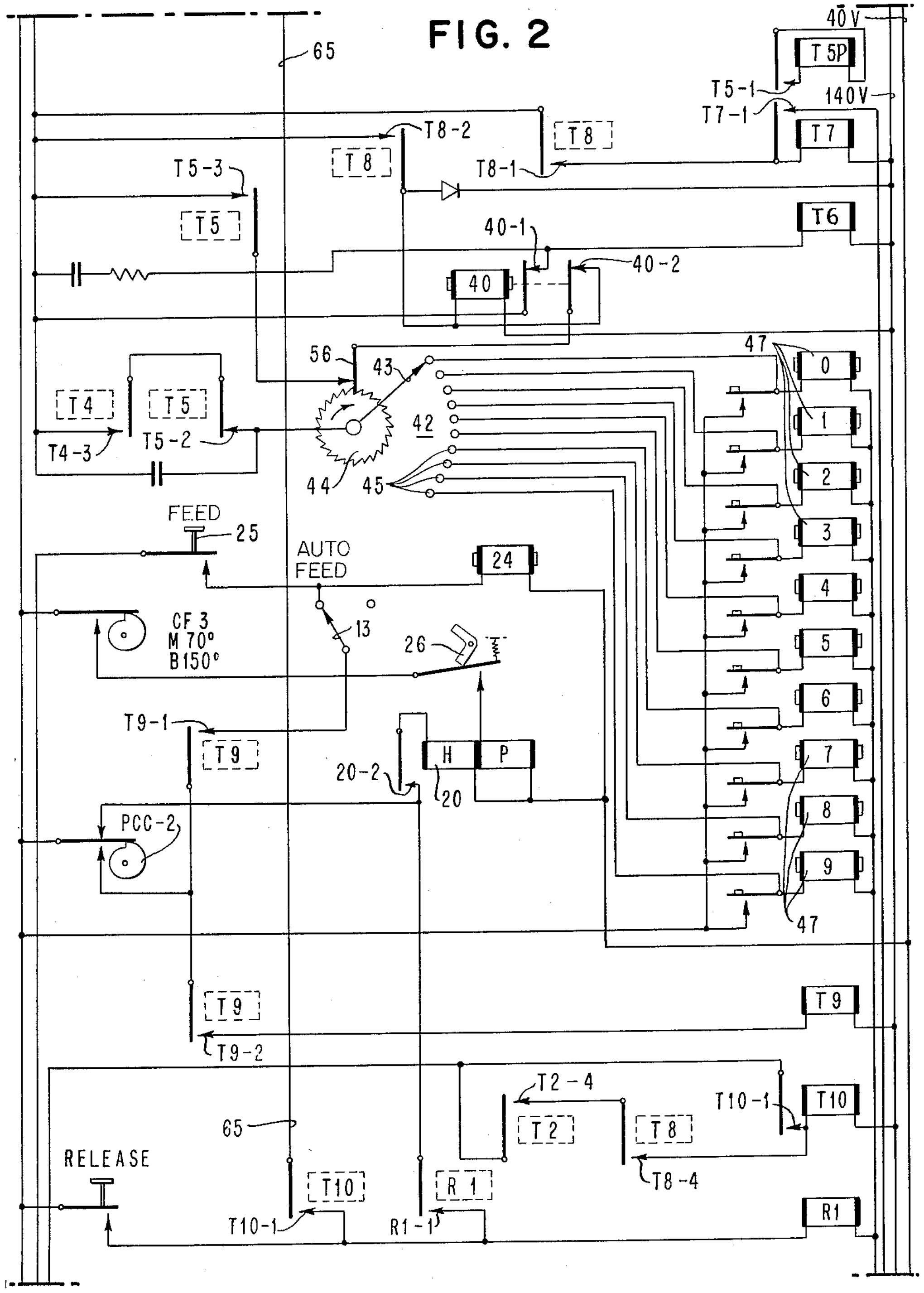
Figure 4:
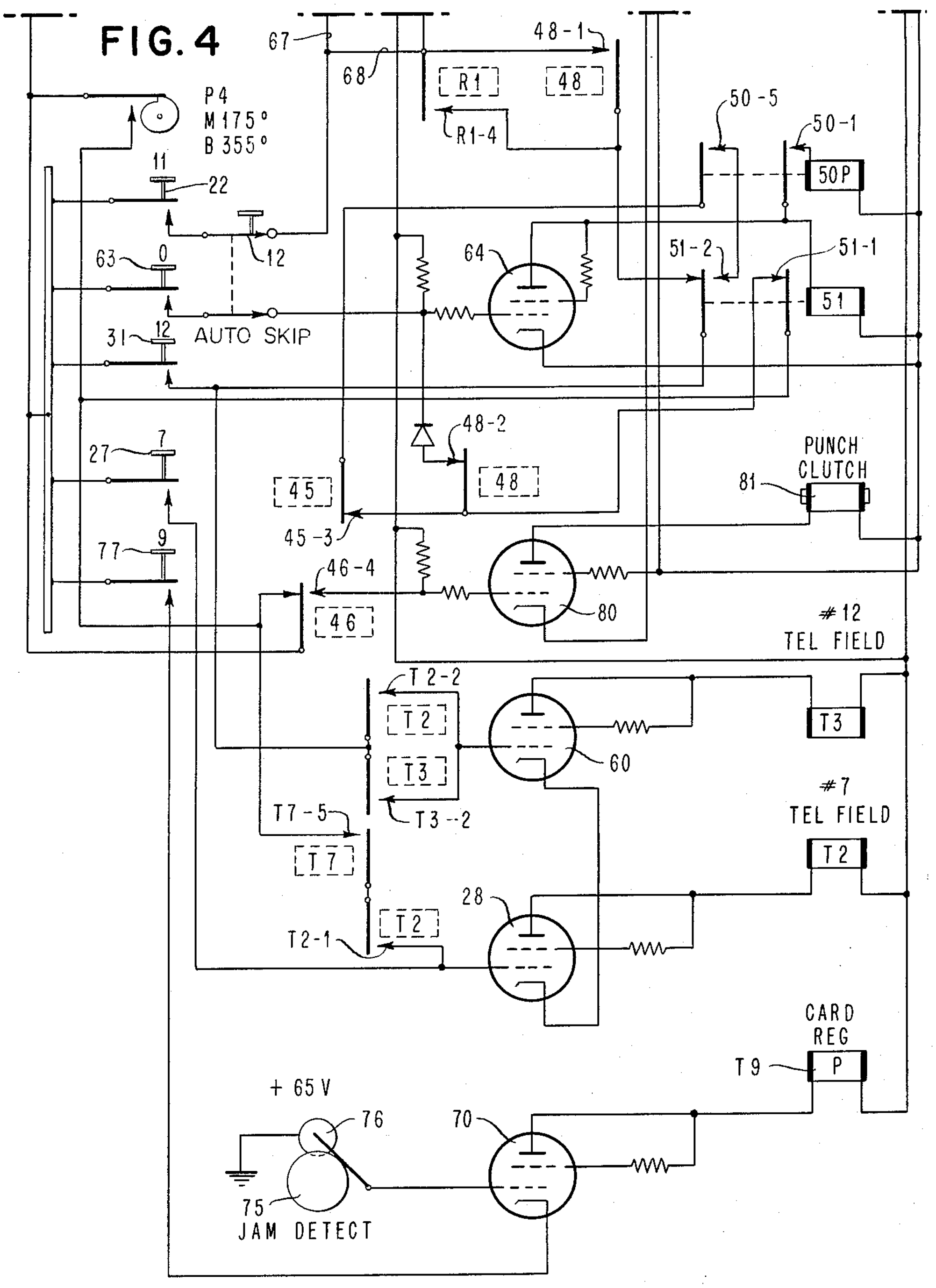
Figure 6:
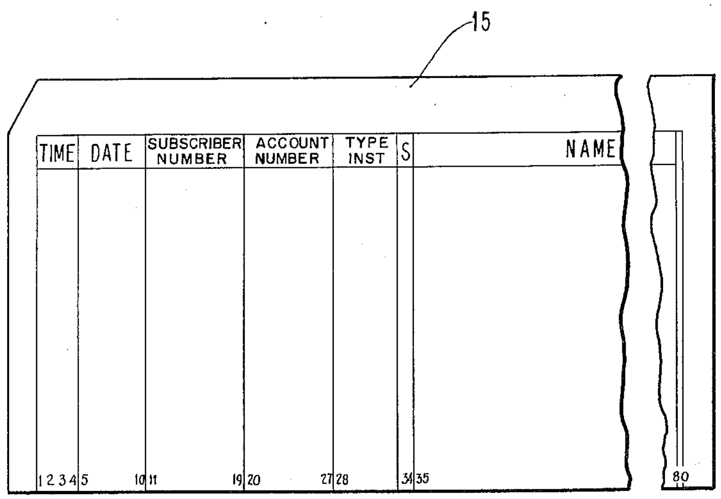
FIG. 6 shows an example of a card for use with the invention.
Figure 5:
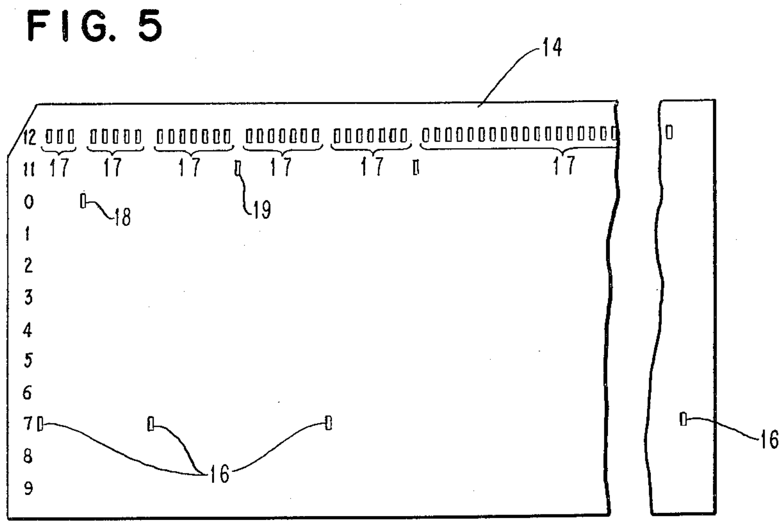
FIG. 5 shows a program card.

To initiate the operation of the system the attendant sets the Telephone switch 11, Auto Skip switch 12 and Auto Feed switch 13 to the On position as shown in the wiring diagram (FIGS. 1, 2 and 4). A program card 14 (FIG. 5) for controlling data entry in a preselected field or fields of data card 15 (FIG. 6) is placed on the program drum of the perforator and the Card Feed key 25 is actuated twice. This positions a data card with the first column of the field to be perforated under the punches preparatory to receiving data transmitted over the telephone. All of the above, with the exception of the actuation of the Telephone switch is normal perforator operation and is described in detail in the Patent 2,647,581. No further attention is needed by the perforator attendant unless an abnormal condition is signalled such as a card jam or no cards in the feed hopper.

The data card 15 is divided into a plurality of fields some of which are to be perforated with data received over the telephone, some duplicated from the previous card and others to be skipped at this time and have data entered later. The fields titled "Time," "Subscriber Number," "Type Inst." and "S" are so called telephone fields and are to receive dialed data. The field titled "Date" is a duplicate field and will receive data sensed from the preceding card. The fields "Account Number" and "Name" are skip fields and will be left blank for data to be entered at some other time.

The program card 14 (FIG. 5) is provided with a perforation 16 in the seven position or row of the first column of each of the telephone fields which perforation, as will be described later, will stop the card under the punches to receive data dialed over the telephone. Each of the columns of the program card corresponding to the remainder of the columns in the telephone field of the data card are provided with perforations 17 in the twelve position which will cause the perforator to automatically position the next column of the card under the punches to receive the next digit.

In the first column of the "Date" field in the program card is a zero perforation 18 and sufficient twelve perforations 17 to control the automatic duplication of the date in the corresponding field of the data card. This is a normal operation of the punch as described in 2,647,581. Duplication of the date carries the cards into the next telephone field i.e., "Subscriber Number" where a seven perforation 16 positions the card to receive data in the succeeding columns under control of a series of twelve perforations 17 until the telephone field is filled. This steps the data card to the "Account Number" field where an eleven perforation 19 in the program card causes the perforator to skip under control of a series of twelve perforations until a seven perforation is reached in the first column of the next telephone field i.e., "Type Inst." In fact, there are really two fields ("Type Inst." and "S") but since they are adjacent the perforator is controlled by twelve perforations until another eleven perforation in the first column of the "Name" field is reached. This causes the perforator to skip all the remaining columns except the eightieth under control of a series of twelve perforations.

In the eightieth column of the program card a seven perforation 16 is provided making this a single column telephone field. This is provided to permit the subscriber to perforate a clear signal, in this instance, a "two" which indicates that the subscriber believes that all data has been entered correctly. It is understood that this check column may be located anywhere in the card after the last telephone field and any numeral may be used as a check signal.

Setting the Telephone switch 11 (FIG. 1) to the position shown connects the signal lamp 72 and buzzer 73 to the Keyboard Restore contact 71 which is open at all times during normal telephone operation. This indicates that the keyboard of the punch is locked out at this time. Should this contact close the buzzer and lamp will signal an abnormal condition. On the other hand, with the switch in an off or normal punch position, i.e., upper contact made, any operation of relay T2 or T3 which indicates the punch is in condition to accept dialed data then the buzzer and lamp will operate to indicate an incorrect setting of the switch 11.

The Auto Skip switch 12 (FIG. 4) prepares a circuit under control of the eleven contact 22 of the program device through the tube 23 (FIG. 3) for energizing Skip relay 48. The Auto Feed switch 13 (FIG. 2) prepares a circuit for the Card Feed Clutch magnet 24 under control of the contacts T9–1 of the Feed Control relay T9 and of the Program Cam contact PCC–2.

It may be well, at this point, to call attention to the fact that all relays designated by a T prefix are those that have been added to the normal punch circuit and form the basis for the invention. Also, that relays designated by an A prefix have been added to the telephone circuit and are not claimed as a part of this invention. All of the circuit above the dot and dash line of FIG. 1 is in the telephone circuit.

The punch attendant now depresses the Feed key 25 (FIG. 2) thus closing a contact from negative potential through the break circuit 20–3 through the key 25 and thence through Card Feed Clutch magnet 24 to positive voltage. Operation of the magnet 24 feeds a data card 15 to the punch bed. The card closes a Card Lever contact 26 (FIG. 2) preparing a circuit for Card Lever relay 20 under control of Card Feed cam CF3. The Feed key 25 is again depressed feeding the first card to the punch station and a second card to the punch bed. At 70° of this cycle the circuit prepared above is completed by the CF3 contacts thereby operating relay 20 which holds over a circuit through contact 20–2 under control of Program Cam contact PCC–2. Relay 20 through its contact 20–3 (FIG. 3) removes negative potential from the Feed key 25 and connects negative to the punching, duplicating and program control circuits.

The punch is now under control of the Auto Skip switch 12 and the program card 14 which is perforated in the eleven perforation 19 of the first column and a twelve perforation 17 in the succeeding columns until the first column of a telephone field is reached which corresponding column is punched with a seven perforation 16. The eleven perforation 19 permits the completion of a circuit from negative or zero potential through the eleven contact 22 (FIGS. 3 and 4), Auto Skip key 12, to tube 23 to activate the grid and thus actuate Skip relay 48 which locks up through its contact 48–6 and continues to skip until a seven perforation 16 is reached in the program card whereupon a circuit is closed from negative through a contact 27, at the seven perforation on the program drum corresponding to the first column of a telephone field, to the grid of tube 28 which activates the first Telephone Field Control relay T2. Actually in the examples shown in FIGS. 5 and 6 the first field is a telephone and not a skip field.

Operation of the relay T2 establishes a hold circuit through its T2–1 contact under control of contact T7–5 and Punch Cam contacts P4 which are effective at 175° of the cycle. Contact T2–2 prepares a circuit for actuating the Telephone Field relay T3 under control of the twelve perforation contact 31 of the program drum and tube 60. Contact T2–3 (FIG. 1) prepares a circuit for Ready relay T1 under control of the Connect-Disconnect contact A7–1 which will be closed at the time the telephone subscriber selects the perforator. Contact T2–4 (FIG. 2) prepares a circuit for Release relay T10 which will be completed when dialing is started. The Release relay is used to assist in releasing or rejecting an "error" card. Contact T2–5 (FIG. 3) sets up a circuit for the tube 32 to complete a circuit through the Keyboard Restore magnet 33 which locks up the keyboard of the perforator while a data card is in a telephone field. Contact T2–6 (FIG. 1) controls the Busy Signal. Its purpose is to indicate that the perforator is in the first column of a telephone field and ready to accept data. Should the card fail to be positioned in a telephone field the contact would be open removing a shunt from around the normal telephone busy signal permitting it to sound.

The data card having reached the high order or first column of the telephone field, the perforator is ready to be selected and operated by a subscriber. Removal of the telephone receiver preparatory to dialing closes contacts 35 (FIG. 1) and prepares a circuit from negative through Dial contacts 36 now closed through the telephone contact 35 and regular telephone switching circuits 37 of the telephone and through the winding of relay A1. Relay A1, however, does not operate, until by dialing the required number the subscriber selects the instant perforator by way of the usual telephone circuit 37. When the connection is made, relay A1 will operate closing a circuit for relay A2 through contact A1–1 and relay A4 through contacts A1–2. This will prepare a circuit for the Telephone Pulse relay T8 which will be completed by the T1 and A6 relays. Relay A4 upon operating will operate relay A7 through contact A4–2. Operation of relay A7 will close the Connect-Disconnect contact A7–1 to operate Ready relay T1 over a circuit from negative potential through contacts T2–3 now closed and A7–1 through the relay to positive potential. This relay through contact T1–1 controls negative current to the pulse circuits of relays T4 and T8 and permits dialed data to enter the perforator only when a card is in the telephone field position. Also through its contact T1–2 it applies the "Ready" tone through the Ready Tone circuit 41 to the telephone line.

A circuit for relay A5 is prepared by closure of contact A4–1 but it will not be completed until relay A1 is released on the first dial pulse to close contact A1–2. Relay A5 will then complete the circuit for relay A6 through its contact A5–1. Relay A1 will complete a circuit for relay A2 through contact A1–1.

Relay A5 is slow to release thereby holding relay A6 closed during dialing thus placing the circuit for the Pulse relay T8 under control of relays T1 and A2. However, relay A7 is also slow to release and since it controls relays T1 through Connect-Disconnect contact A7–1 the pulse relay T8 comes under the control of relay A2 through its contact A2–1. Relay T8 through its contacts T8–2 (FIG. 2) will close a circuit from negative for actuating a switch solenoid 40 thereby actuating the drive pawl 44 of the stepping switch 42 as will be described below.

Relay T6 the Counter Home relay is operated when contact 40–1 of the solenoid 40 closes, upon the switch moving away from home or normal position. First Pulse relay T7 is operated upon the first closure of contact T8–1 and locks up through its contact T7–1 under control of cam operated contact P2 from 140° of one cycle through to 65° of the second cycle. The operation of these two relays T6 and T7 open the Ready Tone circuit 41 during dialing and the stepping of the switch 42.

The stepping switch or counter 42 is disclosed in principle in U.S. patent to Dagger et al. 2,738,130 and therefore it need only be said that it comprises a solenoid controlled rotary switch, the brush 43 of which is driven by a ratchet 44 and stepping pawl (not shown) actuated by the switch solenoid 40 to sweep an arc of contacts 45 which are in turn connected to the interposer solenoids 47 in the perforator. The switch is reset to home position by a circuit through an interrupter contact 56 on the ratchet 44.

The circuit is now in condition for the subscriber to dial data into the selected perforator. Operation of the dial 55 opens the contact 36 releasing relay A1 closing contact A1–2 as described above to actuate relays A5 and A6. Relay A4 being slow to release does not follow the dial contact thereby maintaining the circuit for relay A5 which in turn actuates relay A6 completing the circuit for the Pulse relay T8. The Pulse relay at its contact T8–2 closes a circuit for operating switch solenoid 40 during the first pulse. At the termination of the first pulse contact T8–2 opens the circuit to the switch solenoid 40 thus releasing the pawl which in returning to normal steps the brush 43 one step for each pulse from the dial. In other words, it steps the brush one step each time the contact 36 opens or if the dial is rotated to "four" will pulse relay T8 four times.

When the dial reaches the home position after pulsing the digit, contact A6–2 will close a circuit through contact T7–2 to operate relay T4 which in turn operates relay T5. Due to the fact that the operation of relay T5 is slowed down by having its pick winding short circuited immediately upon being operated by contact T5–1, it will however remain operated sufficient time to permit a short pulse to be transmitted from negative through contacts T4–3 and T5–2 both of which are closed over brush 43 through the selected punch interposer magnet 47 to positive thus setting the desired punch. Immediately following this contact T5–3 closes operating the switch solenoid 40 over a circuit from negative contact T5–3, contact 56 which is operated by the ratchet 44, contact 40–2 through the switch solenoid 40 to positive. This circuit will step the switch 42 until it reaches home or zero position. In this position the contacts 40–1 and 40–2 are opened mechanically and thus prevent further operation of the switch solenoid 40.

Figure 3:
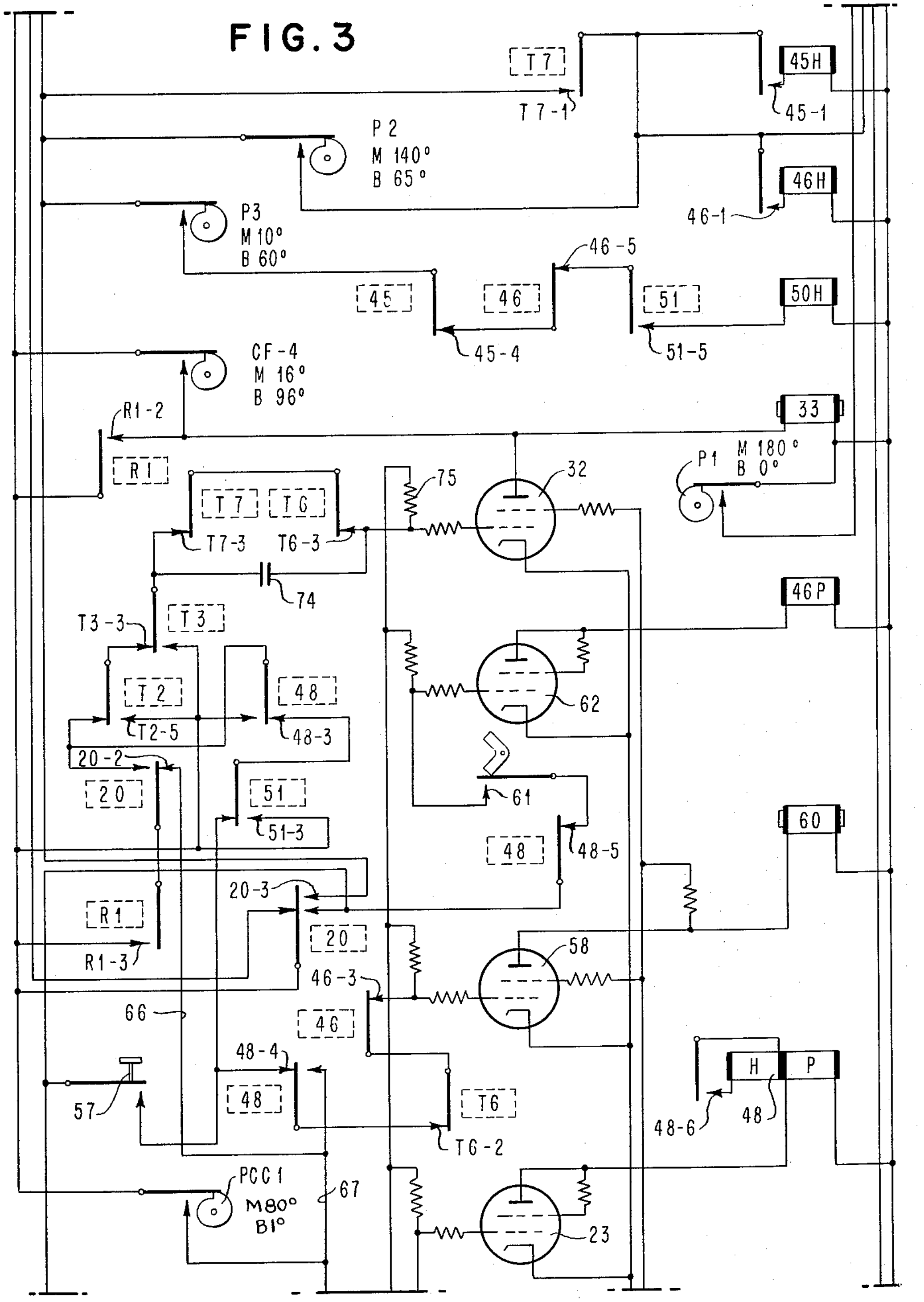

When the selected punch is operated by its associated interposer a bail controlled by the interposer closes a contact 57 (FIG. 3). This contact completes a circuit from negative make contacts 48–4, T6–2 and 46–3 to the grid of tube 58 firing the tube which in turn actuates the Escape magnet 60 thus operating the perforator escapement which closes contacts 61 to complete a circuit for firing tube 62. This tube actuates the Escape Interlock relay 46 which holds through its holding winding which winding is energized through its contact 46–1 under control of cam contact P–2 until 65° of the next cycle. The operation of relay 46 opens the circuit for Escape magnet 60 at contact 46–3 which extinguishes tube 58.

Contact 46–4 will complete a circuit to fire tube 80 which in turn will operate Punch clutch 81. The punch clutch actuates a shaft causing the actuator bail to depress the selected interposer thereby forcing a punch through the card.

Upon completion of this operation the card is stepped to the next column of the telephone field. In this position of the program card a twelve is sensed and a control circuit is closed from negative through twelve contact 31, contact T2–2 (T2 remains locked up while the perforator is in a telephone field) grid of tube 60 firing the tube and actuating Telephone Field relay T3. This relay through its contact T3–1 holds the Ready relay T1 energized permitting entry of data until the telephone field is filled.

In passing out of the telephone field entitled "Time" the program circuit senses a zero perforation 18 indicating a duplicating operation. Here a circuit is closed from negative through zero program contact 63 to the grid of tube 64 firing the tube and actuating #1 Duplicate relay 51. This in turn actuates #2 Duplicate relay 50 over a circuit from negative through cam contact P–3 break contacts 45–4 and 46–5 and through contact 51–5 and the winding of relay 50 to positive. As soon as data is entered in the first column of the Date field and the card stepped to the second column a twelve perforation is sensed in the program card. Due to the fact that relays 50 and 51 are actuated the circuit for maintaining the Duplicate relays 50 and 51 operated is closed through make contacts 51–2 and 50–2 and break contacts 45–3 and 48–2 to fire tube 64 which maintains relays 50 and 51 actuated. This circuit is interrupted during dialing by contact 48–2 but is immediately reestablished and the perforator continues to step until all of the duplicated data, which in this case is the date, has been entered. It may be well to point out and as described in the Patent 2,647,581 that sensing contacts are provided which read data in the preceding card and set up the interposers for perforating the instant card.

The card is now stepped to the eleventh column or beginning of the "Subscriber's Number" field which column on the program card contains a seven perforation 16. This will set up the necessary circuits for dialing data into the card as described above.

Upon stepping out of column nineteen into column twenty which is the first column of a Skip field an eleven perforation 19 in the corresponding column of the program card establishes a "skip" circuit which is closed from negative through contact 22 (FIG. 4) Auto Skip key 12 to the grid of tube 23 firing the tube. This tube operates Skip relay 48 and the perforator proceeds to skip over columns twenty to twenty-seven in the same manner as described above.

Upon reaching column twenty-eight a seven perforation 16 is again sensed on the program card and the fields entitled "Type Inst." and "S" are in position to accept dialed information. It will be noted that in going from field "Type Inst." to field "S" a seven perforation in the program card is not needed since these fields are contiguous.

When the card proceeds to the thirty-fifth column an eleven perforation in the program card sets up the skip circuits and the remainder of the card would normally be skipped under control of twelve perforations in the program card and ejected from the machine. However, referring to FIG. 5 it will be noted that in the eightieth column of the program card there is a seven perforation in place of a twelve. This is a check column and is a telephone field which is provided to permit the subscriber to dial in the digit "two" as an indication that the data has been perforated correctly in the card. Absence of "two" in the last column is an indication to the perforator attendant that an error has been made.

If during dialing in a telephone field the subscriber should realize that an error has been made, the error card can be ejected from the perforator by disconnecting, i.e., depressing the receiver button which will open contact 35 releasing the perforator. All of the A timing relays will be released thus placing the Connect-Disconnect contact A7–1 in the disconnect positions, i.e., right hand break contact closed. Relays T2 or T3 are operated closing a circuit from negative through T3–1 or T2–3 break contact A7–1 over lead 65 through contact T10 through the R1 relay to positive. This relay locks up through its R1–1 contact under control of Program Cam contacts PCC–2 for a period equivalent to feeding a card to column 82½. Relay R1 closes a circuit from negative through contact R1–3 break contact 20–2 leads 66, 67 and 68 to the grid of tube 23 which fires and actuates Skip relay 48. This relay locks up control of contact R1–3. Relay 48 closes a circuit from negative contact R1–3 lead 66 contact 48–4 break contacts T6–2 and 46–3 to the grid of tube 58 firing the tube and actuating the Escape magnet 60 which will permit the perforator carriage to escape freely ejecting the card.

In view of the fact that the perforator is remotely controlled certain signals are necessary to notify both the subscriber and attendant of misoperation of the machines.

With the machine programmed correctly for telephone operation and with cards in the hopper the perforator should be either duplicating, skipping or receiving data in a telephone field. If these conditions are satisfied the Keyboard Restore magnet 33 remains operated through tube 32. During a skip operation the tube circuit is under control of relay 48 which closes a circuit from negative through make contact 48–3, break contacts T2–5, T3–3, T7–3 and T6–3. If duplicating is being done the control is transferred from relay 48 to Duplicating relay 51. The circuit is then traced from negative, make contact 51–3, break contacts 48–3, T2–5, T3–3, T7–3 to the grid of the tube 32. Should either contact fail to close at the proper time magnet 33 would release closing Keyboard Restore contact 71 which will light lamp 72 and actuate a buzzer 73.

During a dialing cycle, contacts T6–3 and T7–3 are opened momentarily to interrupt the grid conditioning circuit for tube 32. However these contacts are shunted by a condenser 74 and a bias resistance 75 which for a certain interval of time, of for example one second, provides a leak circuit for maintaining the tube 32 and magnet 33 operated. If, however, the dialing pulses are interrupted for more than this time interval the magnet 33 will release closing a circuit from negative through contact 71 to operate buzzer 73 and light the lamp 72 indicating to the attendant that either the switch 42 has failed to reset to normal or the card feed has not escaped to the next column following a data entry. Other abnormal conditions which will cause the buzzer and lamp to function are: a card not in proper position in the telephone field, failure of card feed, and no cards in hopper which are controlled by contacts T2–5 and T3–3. It will be noted that all of the above contacts are located in a group in the center of FIG. 3 and all control the operation of tube 32.

The Ready Tone is normally audible to the subscriber upon selection of an idle perforator and the correct positioning of a card in a telephone field. Contact T2–3 closes a circuit through the Connect-Disconnect contact A7–1 in its make position to operate relay T1 which closes the Ready Tone circuit at contact T1–2. Two other contacts control the Ready Tone circuit, i.e. contact T6–1 which will be open if the switch 42 does not return to home position and contact T7–4 which will be opened if the dialed information is not entered in the card and the card escaped to the next column.

A Card Jam indicator is provided for controlling the tube 70 which in turn will control the Card Reference relay T9. This relay will operate the Card Feed clutch 24 through its contact T9–1 and the Auto Feed key 13 under control of Program Cam contact PCC–2. The grid of circuit of tube 70 is controlled by the closure of a circuit between the card feed roll 75 and the pressure wheels 76 of the perforator as the trailing edge of the data card passes from between them. This permits the closure of a circuit from the machine ground (65 v.) to the grid of tube 70. The tube cannot fire however until the cathode circuit is established. This is done by the closure of the nine contact 77 with the program drum as the trailing edge of the program card passes from under the nine star wheel. These two circuits should close simultaneously. If they do not tube 70 will not conduct thus releasing relay T9 which in turn will open the Auto Feed circuit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore to be limited only as indicated by the scope of the following claims.

What is claimed is:

1. In a data transmission system, a telephone station, a switching means, a card perforator, a dial at said station controlling said switching means to select and transmit data to said perforator, a program means in said perforator, and signal means controlled by said program means to indicate to said station that said perforator is in condition to receive data.

2. In a data transmission system, a telephone station connected to a distant perforator, a program means in said perforator, a record feeding means in said perforator, said program and feeding means operating in synchronism and a signal means indicating to said station a non-synchronous condition as the result of a failure of said feeding means.

3. In a data transmission system, a telephone station connected to a distant perforator, a program means and a record feeding means in said perforator, said program and feeding means operating in unison to feed a record to a predetermined position to receive data from said station and signalling means for indicating to said station when said record is in said position.

4. In a data transmission system, a telephone station connected to a distant perforator, a dial at said station and, a stepping switch connected to the punch magnets of said perforator, said switch being actuated by said dial to select one of said magnets and a circuit completed through said switch by said dial when in home position to actuate said selected magnet.

5. In a data transmission system, a telephone station connected to a distant perforator, a disconnect button at said station, a record feed in said perforator and, a circuit controlled by said button to actuate said feed to eject a record from said perforator.

6. In a data transmission system, a telephone station, a distant perforator, a telephone line connecting said station and perforator, pulsing means at said station, a stepping switch in said perforator controlled by said pulsing means, punch magnets in said perforator connected to said stepping switch whereby one of said magnets may be selected and operated by said pulsing means.

7. In a data transmission system, a telephone station connected to a distant perforator, a dial at said telephone, a circuit in said perforator comprising, a pair of contacts, a vacuum tube and a relay, said contacts being controlled by said dial, a signal circuit in said perforator controlled by said relay, said contact interrupting the grid circuit of said tube to release said relay each dial pulse, means bridging said contact pair to momentarily maintain said relay operated during a normal dialing pulse, said bridging means being adapted to break said grid circuit during a pulse of abnormal length whereby said relay is released effecting a signal of abnormal condition in the perforator.

8. In a data transmission system, a telephone station connected to a distant perforator, a dial at said telephone, a tone circuit at said telephone indicating a readiness of said perforator to receive data, a switch in said perforator for selecting a punch magnet in accordance with pulses from said dial, a contact in said tone circuit controlled by said switch while away from a home position for an abnormal period to interrupt said tone circuit as an indication of an abnormal condition.

9. In a data transmission system, a telephone station connected to a distant perforator, a dial at said station, a stepping switch connected to punch actuators in said perforator, said switch being positioned by pulses from said dial to complete a circuit to one of said magnets and a contact adapted to be closed when said switch is in home position whereby a ready signal is transmitted to said station.

References Cited in the file of this patent

UNITED STATES PATENTS

| | | |
|---|---|---|
| 2,668,875 | Shepherd | Feb. 9, 1954 |
| 2,688,658 | Carpenter et al. | Sept. 7, 1954 |
| 2,782,257 | Blashfield et al. | Feb. 19, 1957 |
| 2,794,070 | Ostline | May 28, 1957 |